A. J. WHITNEY.
Fish Boner and Scaler.
No. 221,949. Patented Nov. 25, 1879.
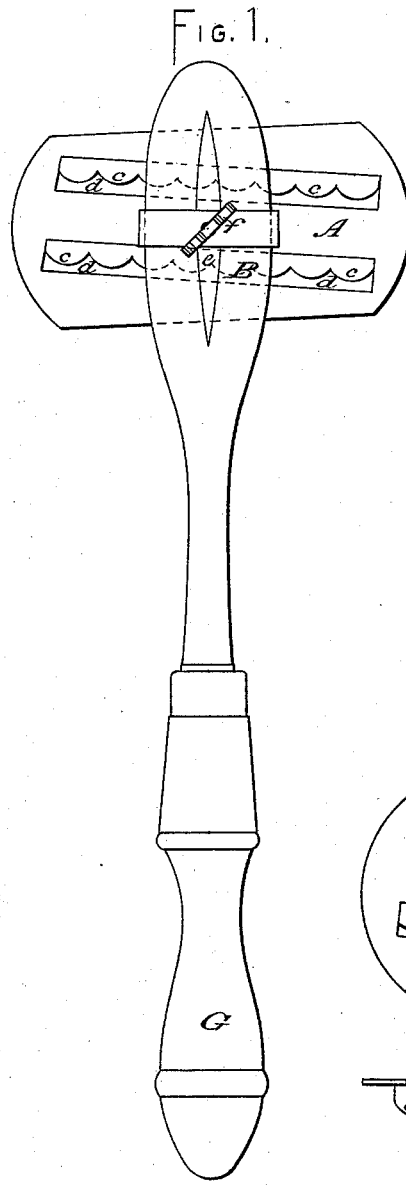
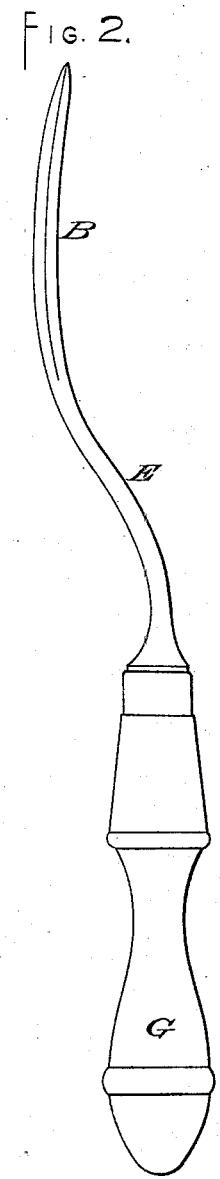
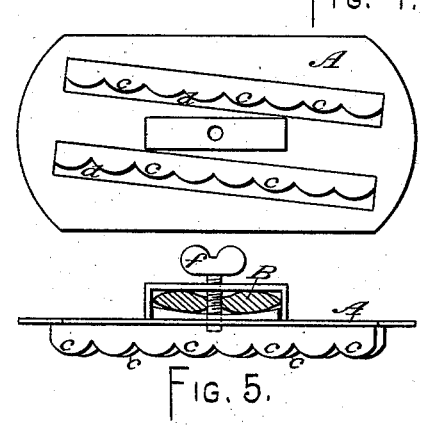
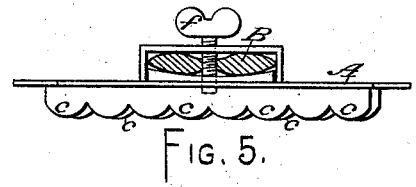
WITNESSES:
Charles C. Stetson
E. B. Bolton
INVENTOR:
Alice J. Whitney
by her attorney
Thomas D. Stetson

UNITED STATES PATENT OFFICE.

ALICE J. WHITNEY, OF CHICAGO, ILLINOIS, ASSIGNOR TO J. D. C. WHITNEY, OF SAME PLACE.

IMPROVEMENT IN FISH BONERS AND SCALERS.

Specification forming part of Letters Patent No. 221,949, dated November 25, 1879; application filed September 13, 1879.

*To all whom it may concern:*

Be it known that I, ALICE J. WHITNEY, of Chicago, in the county of Cook and State of Illinois, have invented certain new and useful Improvements in Instruments for Removing the Scales and Extracting the Bones from Fish; and I do hereby declare that the following is a clear, full, and exact description of the invention, which will enable others skilled in the art to which it appertains to make and use the same, reference being had to the accompanying drawings, and to the letters of reference marked thereon, which form a part of this specification.

Figure 1 is a top view of the boner and scaler combined. Figs. 2 and 3 are side and top views of boner, with scaler detached. Figs. 4 and 5 show top view and side elevations of scaler.

The main object of my invention is to detach the bony skeleton of a fish from the fleshy portion in such a manner that after the operation the flesh shall be in the same general shape as before, remaining compact and showing no marks of mangling.

The shank of boner is a compound curve, as shown at E, Fig. 2, to bring the hand of operator on a parallel plane to the working elliptical blade B. The concavity *e*, Figs. 1 and 3, which may be more or less extensive, is to reduce friction caused by passage of blade B through the fish. The surface of blade B is slightly convex, with a uniform taper to the surrounding edge H, Figs. 1, 2, and 3, which is not sharp, to facilitate the purpose for which it is designed.

Set-screw *f*, Figs. 1 and 5, is for securing scaler to boner. For scaling, the scaler A, Figs. 4 and 5, should be attached to blade B, as in Fig. 1.

The scaler has a series of teeth, *c c c c*, Figs. 1, 4, and 5, so formed, as shown, that they will not tear the skin, but will effectually remove the scales. These teeth are placed at an angle to the blade B, to meet the natural movement of the arm of operator. The teeth *c c c c* are also inclined at a slight angle from vertical to work under edges of scales more readily. When scaling is done, remove scaler and rinse blade B for boning.

*Directions for boning.*—First, cut out all fins but those on each side at shoulder, by making an incision at either side of fin and taking it out.

Second, cut off tail, and split fish to tail.

Third, cut across just below line of fins left on, on both sides, being careful not to cut through backbone.

Fourth, insert rounded end of blade B at the point in last cut where the flesh is thickest, pressing it between flesh and bone for about an inch, and then press outward toward belly or open side of fish to liberate the ribs. Replace at point where you left the backbone, press down two or three inches, and out at edge again. When all the ribs are loosened turn blade B sidewise, and press directly down to tail. While doing this hold the fish first by head, till you get started, and then by left hand pressed gently on top of fish to hold in place.

Fifth, when one side is loosened, turn back flesh and turn fish over, leaving the loosened side extended flat, so it will not be under the boner.

Sixth, proceed same with second side.

Seventh, lay fish on back and lift bone from tail upward till it meets the fin bones at upper part of back. Cut at each side of this and lift out the skeleton.

Eighth, pass the finger from shoulder to tail over each side of the fish as it lies on its back, and if a bone has been detached by any means it will be readily detected by the touch and removed.

The fish is left by this process like a slice of meat, and may be handled and cooked in any manner.

G, Figs. 1 and 2, is handle, of any form desirable for the purpose. *g*, Fig. 3, is hole to receive end of set-screw *f*.

I do not confine myself to the exact form and dimensions as herein shown and described, but only generally so.

This device may be made of any suitable material. Either wood, bone, or metal will answer.

I am aware that the bones of fish are sometimes extracted; but I am not aware that any device has been invented especially for the purpose, or any having the characteristics of mine.

Having thus described my invention, what I claim, and desire to secure by Letters Patent, is—

1. A fish-boner having a curved shank, E, in combination with the elliptical blade B and handle G, all substantially as specified.

2. The concavity $e$, in combination with the convex surface $h$ and edges H, all substantially as and for the purpose specified.

3. The scaler A, in combination with angled teeth $c\ c\ c\ c$, openings $d$, and set-screw $f$, all substantially as described.

4. A fish-boner, as aforesaid, in combination with the scaler aforesaid, all substantially as and for the purpose specified.

A. J. WHITNEY.

Witnesses:
 THOMAS WILY TAYLOR,
 JAS. D. C. WHITNEY.